Aug. 4, 1953  W. E. PRICE  2,647,483
METAL FORMING AND WELDING MACHINE
Filed Dec. 28, 1951  5 Sheets-Sheet 1
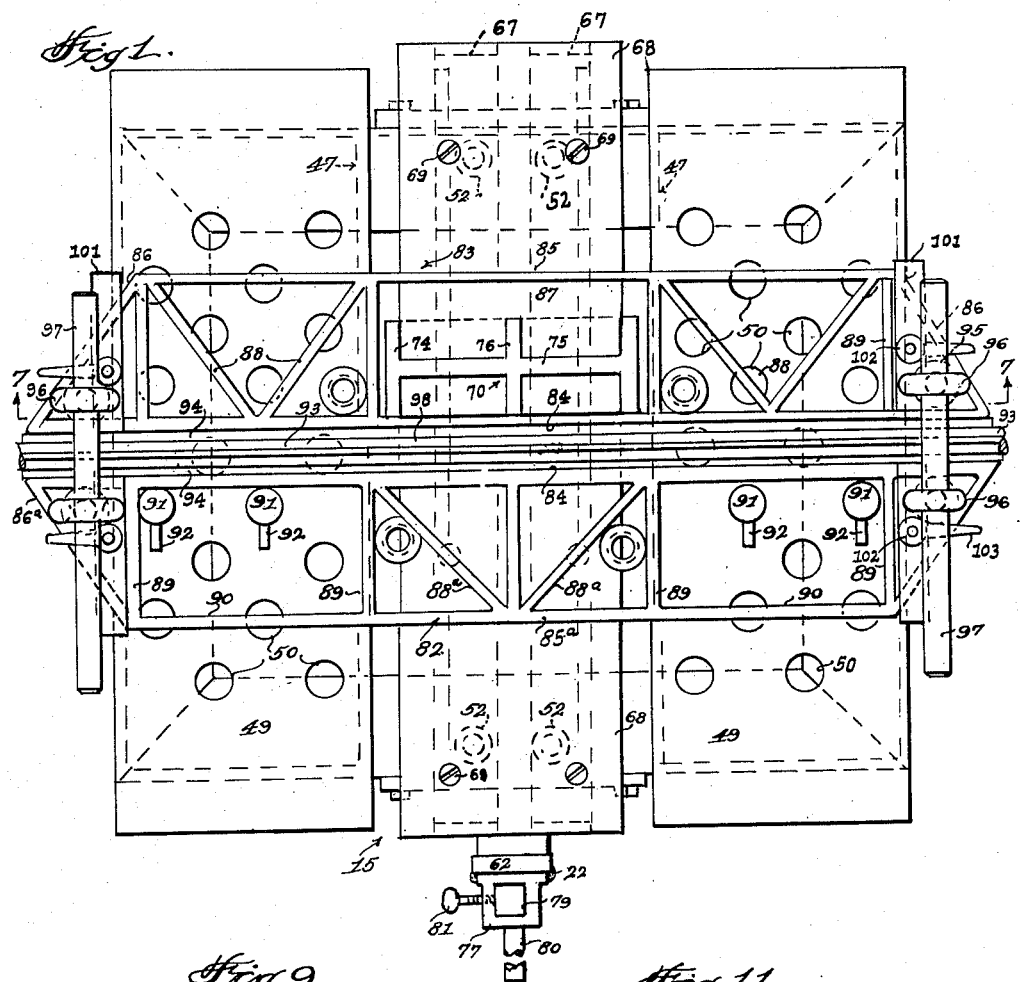
Fig. 1.
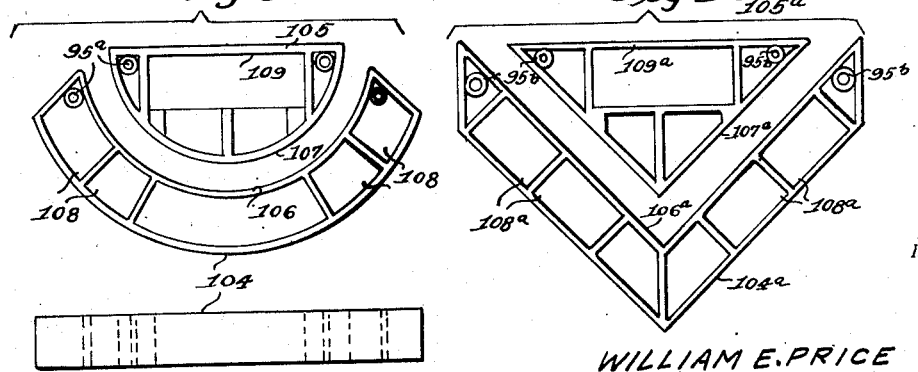
Fig. 9.  Fig. 11.
Fig. 10.
Inventor
WILLIAM E. PRICE
By John N. Randolph
Attorney

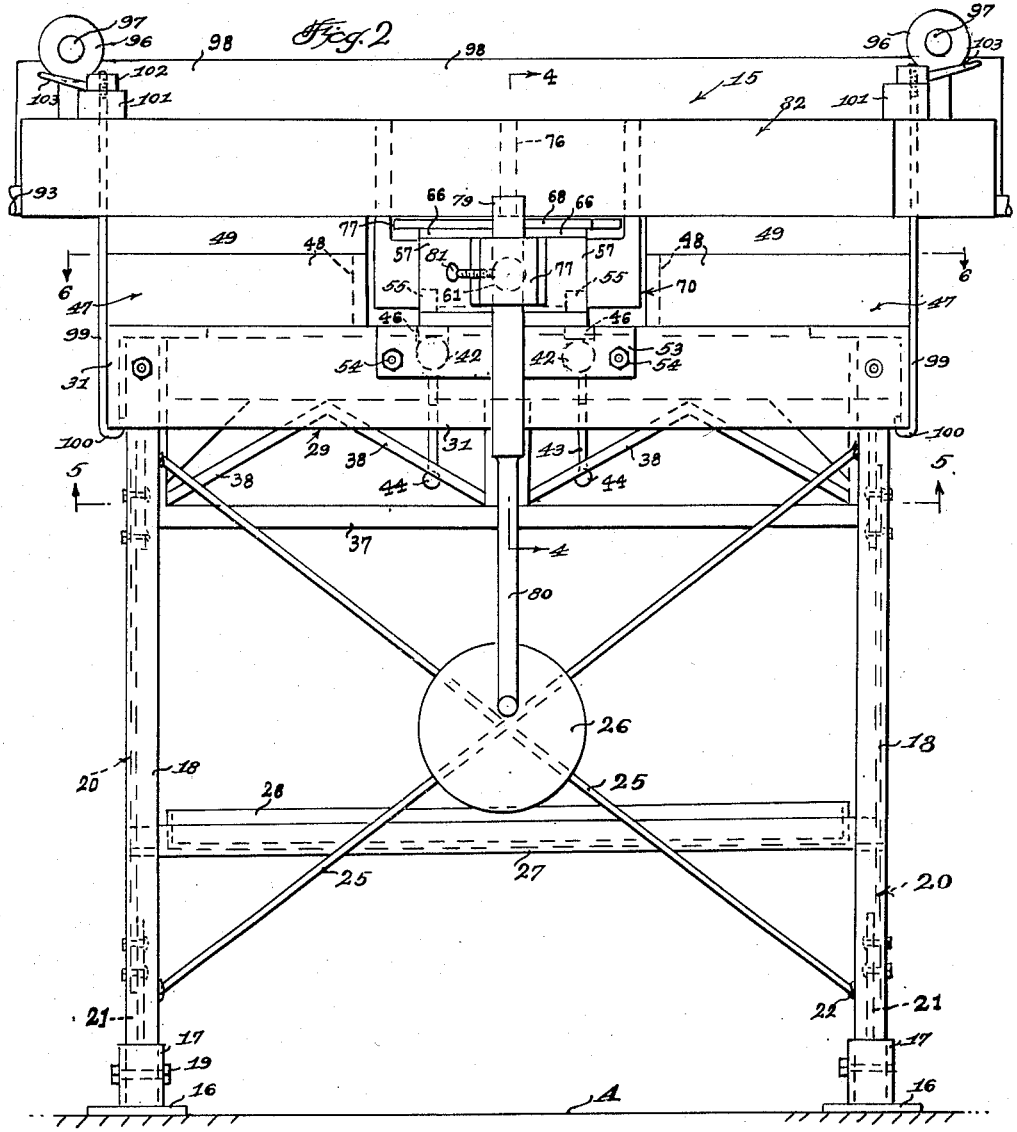

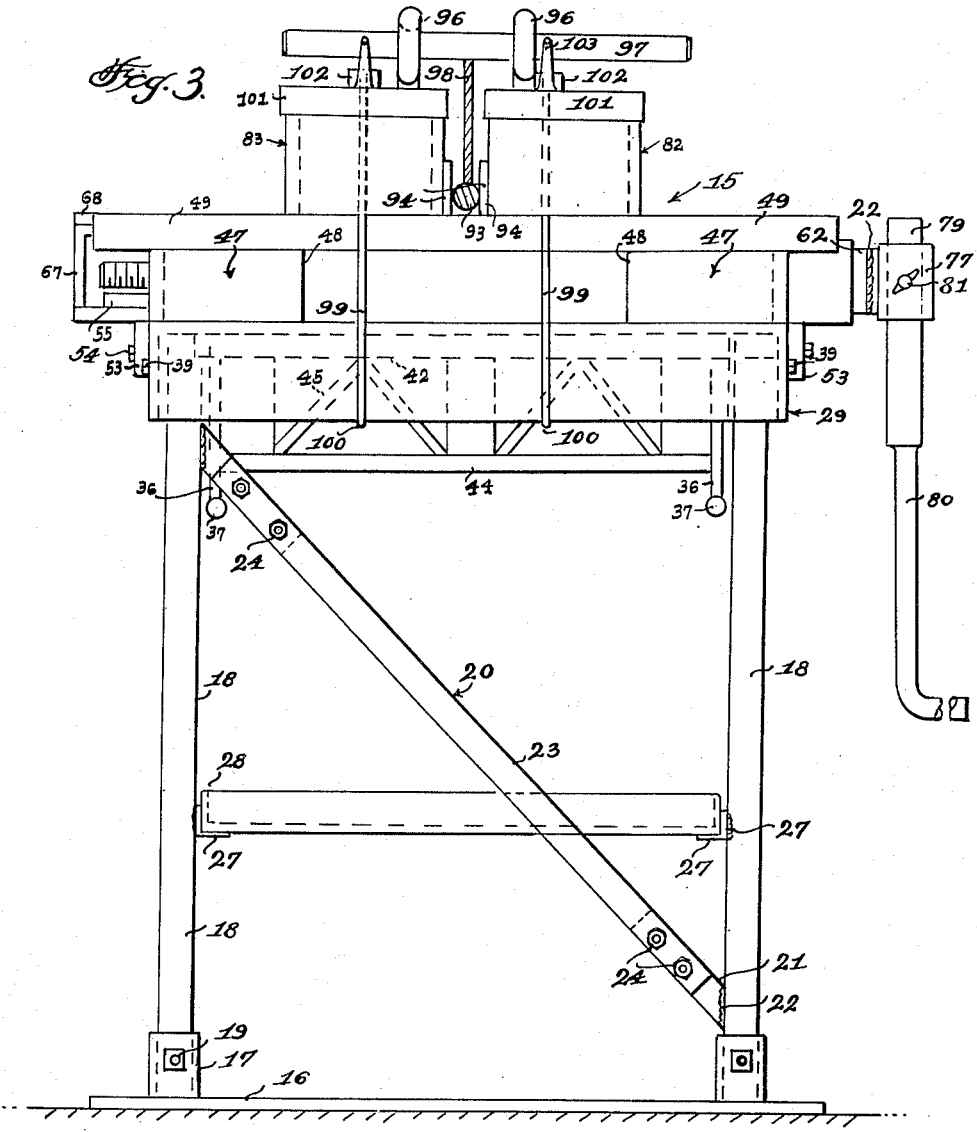
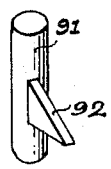

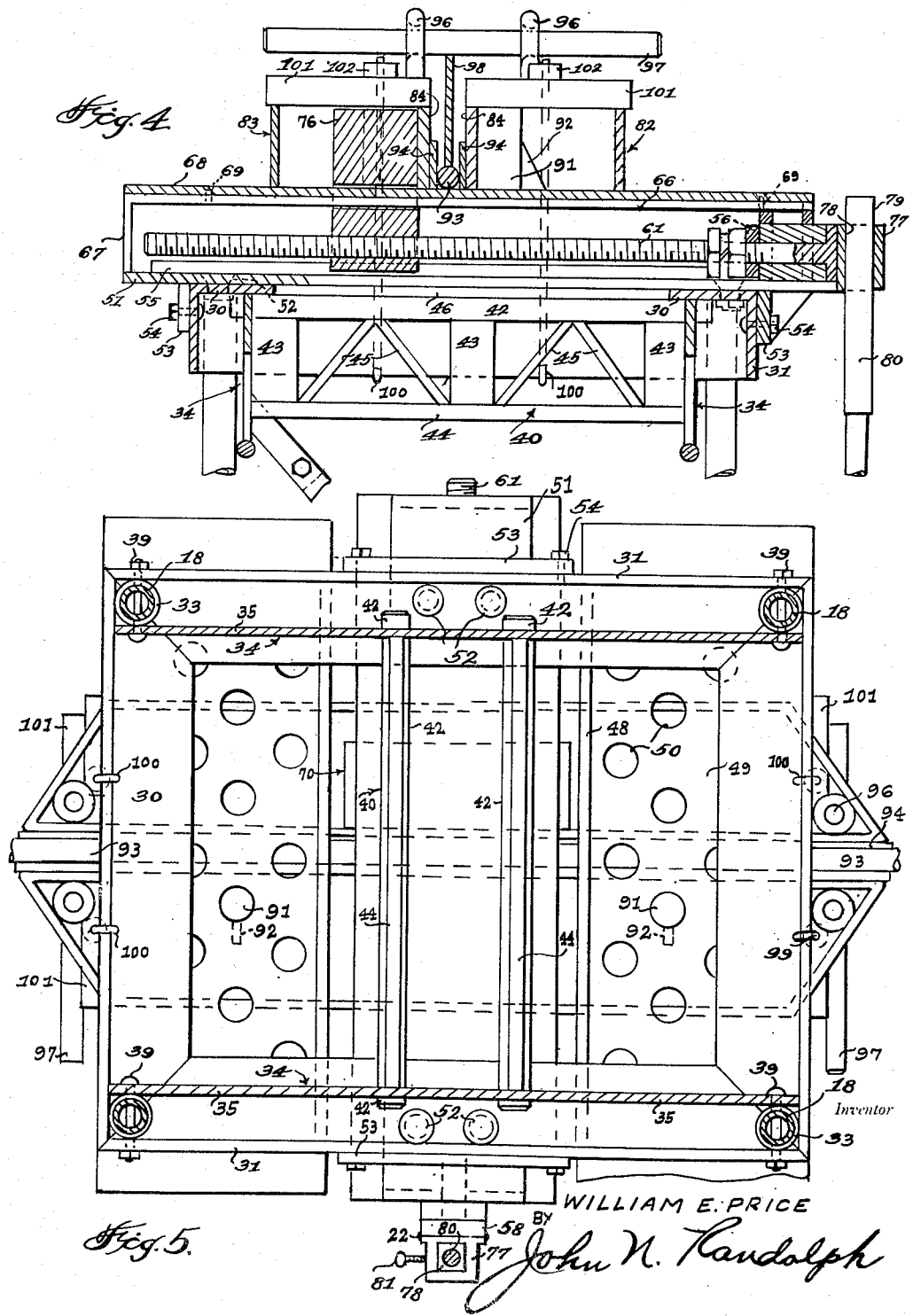

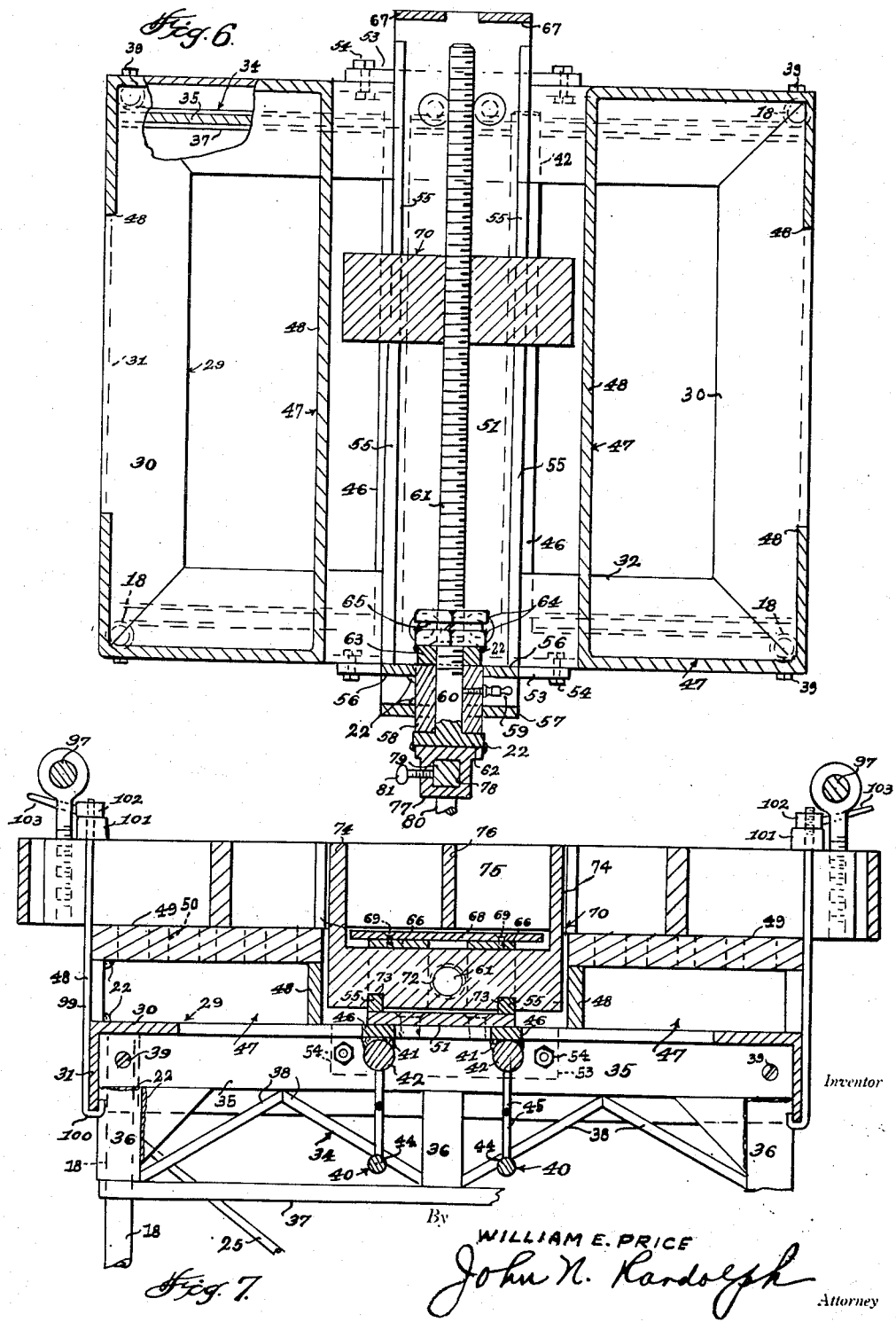

Patented Aug. 4, 1953

2,647,483

UNITED STATES PATENT OFFICE 2,647,483

METAL FORMING AND WELDING MACHINE

William E. Price, Sixes, Oreg.

Application December 28, 1951, Serial No. 263,918

13 Claims. (Cl. 113—99)

This invention relates to a novel machine for forming and welding metals including a vise having replaceable jaws which are supported adjustably on a working surface of the machine and one of which is mechanically movable toward and away from a second detachably fixed jaw for clamping work to be welded between said jaws to prevent distortion of the work incident to the welding operation.

Another object of the invention is to provide a forming and welding machine wherein pairs of differently shaped vise jaws may be employed to function as a jig for properly shaping work pieces to be welded into a finished product produced therefrom and wherein distortion of the member or members being welded in any direction during the welding process will be prevented.

Still a further object of the invention is to provide a machine wherein pairs of jaws having coacting jaw faces of various shapes may be quickly and easily applied interchangeably to the machine and adjustably supported on the working surface thereof with one of the jaws in a fixed position and the other jaw detachably engaging a feeding member whereby the said last mentioned jaw may be mechanically displaced toward and away from the fixed jaw and effectively retained in various adjusted positions.

Various other objects and advantages of the invention will hereinafter become more fully apparent from the following description of the drawings, illustrating a preferred embodiment thereof, and wherein:

Figure 1 is a top plan view of the machine;

Figure 2 is a front elevational view thereof;

Figure 3 is a side elevation view of the machine looking from left to right of Figure 2;

Figure 4 is a transverse vertical sectional view taken substantially along a plane as indicated by the line 4—4 of Figure 2;

Figure 5 is a horizontal sectional view taken substantially along a plane as indicated by the line 5—5 of Figure 2;

Figure 6 is a horizontal sectional view taken substantially along a plane as indicated by the line 6—6 of Figure 2;

Figure 7 is a longitudinal vertical sectional view taken substantially along a plane as indicated by the line 7—7 of Figure 1;

Figure 8 is a perspective view of one element of the machine;

Figure 9 is a plane view illustrating another set of clamping jaws for use with the machine;

Figure 10 is an edge elevational view of the outer side of the larger clamping jaw of Figure 9, and Figure 11 is a view similar to Figure 9 illustrating a third set of clamping jaws for use with the machine.

Referring more specifically to the drawings, the metal forming and welding machine in its entirety is designated generally 15 and includes two corresponding bars 16 each of which is flat and is provided adjacent each end thereof with an upstanding socket 17. The two bars 16 form the base of the machine 15 and are adapted to rest on a flat supporting surface A, to which the said bars may be secured, if desired, by suitable fastenings, not shown. Each of the sockets 17 receive the lower end of a leg 18, which leg is secured therein by a detachable fastening 19 and thus supported in an upright position. The pair of legs 18 which are supported on each of the base members 16 are connected by a diagonal brace 20 formed of end sections 21 which are welded or otherwise secured to the remote ends of said legs 18, as indicated at 22, and an intermediate section 23, the ends of which overlap the adjacent ends of the end sections 21 and are secured thereto by detachable fastenings 24. As best seen in Figure 2, the legs 18 which are supported on corresponding ends of the base members 16 are connected by cross braces 25 the ends of which may be secured as by welding, as indicated at 22 to said legs 18. A name plate 26 is preferably secured to the intermediate portions of the cross braces 25 at the front of the machine 15. The legs 18 which are connected by the cross braces 25 are also connected by horizontally disposed angle braces 27, which may likewise be welded to said legs. The braces 27 are of angular cross section, as illustrated in Figure 3, and each includes an inwardly extending horizontal flange, upon which flanges a tray 28 is detachably supported.

As best seen in Figures 4, 5 and 7, the machine 15 includes a rectangular supporting frame 29 each side of which is of angular cross section including a horizontal portion 30 and a depending vertical flange 31. The flanges 31 extend downwardly from the outer edges of the horizontal portions 30. As seen in Figures 5 and 6, the frame 29 defines a relatively large central opening 32. The four legs 18 have their upper ends abutting the undersides of the horizontal frame portions 30 at the corners of said frame and each leg 18 has a sleeve or collar 33 disposed around and secured to its upper end, as seen in Figure 5.

As best seen in Figures 4 and 7, a girder, designated generally 34 is secured in any suitable manner as by means of welding to the undersides of the front and rear portion of the frame 29 and is disposed substantially parallel to the adjacent depending frame flange 31. Each girder 34 includes an upper plate 35 which is secured to the under and inner sides of the frame 29 with its sides in a vertical plane and which is provided with longitudinally spaced depending hanger members 36 which support a bottom girder member 37 which is secured to the lower ends of said hanger members. The hanger members 36 are braced relatively to the upper girder member 35 by diagonal braces 38. As best seen in Figures 4 and 5, the girders 34 are secured in the frame 29 inwardly from and substantially parallel to the two depending frame flanges 31 which constitute the front and rear of the frame 29. The upper ends of the legs 18 having the collars 33 fit snugly in the corners of the frame 29 between said depending flanges 31 and the ends of the girder plates 35 and are preferably secured to the frame 29 and girders 34 by fastenings 39. The two girders 34 support a pair of trusses 40 and for this purpose the upper edges of the girder plates 35 are each provided with two spaced notches 41. Each truss 40 includes a rod 42. The ends of the rods 42 engage in corresponding notches 41 of the two girders 34, as best illustrated in Figures 5 and 7. As seen in Figure 4, each truss 40 also includes a plurality of hangers 43 which depend from the rod 42 and which support a bottom truss member 44 which is secured to the lower ends of said hangers 43. Each truss 40 includes a plurality of diagonal braces 45 connecting and suitably secured to the parts 42, 43 and 44 thereof. Each truss 40 also includes a bar 46, which is suitably secured, as by welding, to the upper surface of the rod 42 and which terminates in spaced relationship to the ends of said rod. The ends of the two truss bars 46 abut the inner edges of the horizontal portions 30 at the front and rear of the frame 29 and are disposed with their upper surfaces in the same plane as the upper surface of the frame 29, as seen in Figure 4.

A pair of corresponding supporting bars 47 are disposed on the frame 29, one adjacent each end thereof and are secured thereto as by welding, said bars 47 being disposed on edge and including intermediate portions 48 which extend from front to rear of the machine 15 and which are spaced laterally outwardly from the trusses 40. A plate 49 is disposed on the upper edge of each of the supporting members 47, said supporting members 47 being secured preferably by welding, as indicated at 22, to the frame 29 and plates 49. Each of the two plates 49 is provided with a plurality of spaced openings 50 for a purpose that will hereinafter become apparent.

A plate 51 rests upon the upper truss members 46 and extends from front to rear of the frame 29 and to beyond the front and rear ends thereof. The plate 51 is secured by fastenings 52 to the horizontal portions 30 of the front and rear parts of the frame 29 and has transversely extending depending flanges 53 which are secured to and depend from the underside thereof, adjacent the ends of the plate 51, and which abut against the depending flanges 31 of the front and rear portions of the frame 29. The said flanges 53 are detachably secured to said depending flanges 31 by fastenings 54. The plate 51 is provided on its upper side with longitudinally extending parallel ways 55 one of which is disposed adjacent each side edge thereof and which ways extend to adjacent the ends of the plate 51. A plurality, preferably four plates 56 and 57 are secured on edge to the upper surface of the plate 51 and transversely thereof. The said plates 56 and 57 are disposed on the end of the plate 51 located beyond a front of the frame 29 and beyond the forward end of the ways 55. Two of the plates 56 are spaced transversely from the other plate 56 and the plate 57 to provide a gap therebetween for receiving a bushing 58 which is secured to the plates 56 and 57 and thus rigidly supported above and longitudinally of the plate 51. The plates 56 and 57 are preferably secured to the bushing 58 and to the upper side of the plate 51 by welds 22. The cross plate 57 differs from the plates 56 in that its upper edge is below the level of the upper edges of the plates 56 for accommodating a lubricating fitting 59 which is mounted radially in the bushing 58 by means of which the bore of said bushing is lubricated for lubricating the unthreaded portion 60 of a feed screw 61 which is journalled in and supported by the bushing 58. The feed screw 61 has a threaded portion extending from the inner end of the bushing 58 to adjacent the opposite rear end of the plate 51 and which is disposed above and spaced from said plate, as illustrated in Figures 4 and 7. The feed screw 61 is provided with a head 62 at the terminal of its unthreaded portion forming a thrust plate which abuts against and turnably engages the outer end of the bushing 58. A disc 63 is turnably mounted on the feedscrew 61 and abuts against and turnably engages the opposite, inner end of the bushing 58 to form a thrust washer. The said washer 63 is retained against the bushing 58 by two jamb nuts 64 which are threaded on the feed screw 61 and one of which abuts the opposite side of the washer 63. A lock washer 65 is preferably interposed between the jamb nuts 64.

A pair of bars 66 are disposed above the plate 51 in laterally spaced relationship to one another and extend longitudinally of said plate. The forward ends of the bars 66 are secured to the upper edges of the bushing retaining plates 56 in any suitable manner as by welding, and said bars 66 have down-turned portions at their opposite rear ends forming supporting legs 67 which rest upon and are secured to the rear end of the plate 51. A top plate 68 is supported on and secured to the bars 66 by a plurality of fastenings 69 and is disposed between and in the same plane as the upper surfaces of the plates 49.

A follower, designated generally 70, includes a substantially solid block-like bottom portion 71 having an opening 72 extending transversely therethrough which is threaded to threadedly engage the feed screw 61. The bottom surface of the block 71 is provided with parallel transverse grooves 73 which slidably fit over the ways 55 and by means of which the block and follower are prevented from revolving when the feed screw 61 is rotated so that the follower 70 will thus be displaced toward and away from the front and rear of the machine 15 or in direction from right to left or left to right of Figure 4. The follower 70 includes upright upwardly extending end walls 74 which straddle the bars 66 and plate 68 and likewise includes an upper longitudinal wall portion 75 and a transverse wall portion 76 which are disposed above the plate 68 and which combine with the upper surface of the block 71 to provide a slot 77 in which the bars 66 and plates 68 are accommodated. The wall portion 75 is formed integral at its ends with the end walls 74 and the transverse wall 76 is formed integral with the intermediate portion of the wall 75. It will be readily apparent that the follower 70 is applied to the feed screw 61 before the bars 66 are secured to the bushing plates 56 and the plate 51 so that the said bars 66 and the plate 68 may be inserted through the slot 77 and the bars 66 then secured to the plates 56 and the plate 51. However, the plate 68 may be removed from or applied to the bars 66 after said bars are secured to the bushing plate and the bottom plate 51.

It will also be readily apparent that the plates 51 and the parts connected thereto and supported thereon including the feed screw 61, follower 70 and plate 68 may be removed as a unit with the bottom plate 51 by removing the fastenings 52 and 54.

A sleeve member 77 has a flat face which abuts against and is secured as by means of welding as seen at 22 to the outer side of the thrust plate 62. The sleeve 77 has a noncircular bore or recess 78 disposed perpendicular to the axis of the feed screw 61 in which a noncircular shank end 79 of a hand crank 80 is snugly but detachably received. A set screw 81 which is threaded into the sleeve 77 secures the shank 79 in said sleeve whereby manual rotation of the crank 80 will revolve the feed screw 61 for moving the follower 70 toward either the front or rear end of the frame 29.

As best illustrated in Figures 1, 2, 3 and 4, a pair of clamping or vice jaws 82 and 83 are shown supported on the coplanar upper surfaces of the plates 49 and 68, longitudinally of the frame 29 and parallel to its front and rear sides. The vice jaws 82 and 83 are preferably of openwork construction to include substantially flat adjacently disposed corresponding jaw faces 84 which are disposed in vertical planes perpendicular to the plates 49 and 68 and which extend from end-to-end of the jaws 82 and 83. The jaws 82 and 83 are somewhat longer than the machine 15 so as to project beyond the remote side edges of the plates 49, as seen in Figure 1. The jaw 83 is provided with a relatively large central opening 87 for accommodating the upper portions 74, 75, 76 of the follower 70 and which may abut against either of the inner or outer parallel walls of said jaw 83, for displacing the jaw either toward or away from the jaw 82 when the follower 70 is moved by operation of the feed screw 61. The inner wall of the jaw 83 is formed by the wall portion defining the jaw face 84 thereof and the outer wall 85 of said jaw is disposed parallel to said inner wall and has obliquely disposed end portions 86 extend toward and merge with the ends of the inner wall forming the jaw face 84. The other jaw 82 likewise includes an outer wall 85a having obliquely disposed end portions 86a, which wall and end portions correspond to the wall 85 and its end portions 86. The jaw 83 differs from the jaw 82 in that it is provided with diagonal braces connecting the end portions of its walls 84 and 85, which braces 88 are disposed beyond the ends of the opening 87. The jaw 82 is provided with diagonal braces 88a intermediate of its ends. Each of the jaws is provided with a plurality of transverse walls 89, which walls 89 combine with the inner and outer walls of the jaw 83 to form the opening 87. The walls 89 of the jaw 82 define openings 90 adjacent the ends of the jaw 82, for a purpose that will hereinafter become apparent.

Selected openings 50 of each of the plates 49 are adapted to receive and snugly engage complementary ends of retaining pins 91 which project upwardly from said plates 49 through the jaw openings 90 and which abut the inner wall 84 of the jaw 82 to retain said jaw 82 against displacement toward the front end of the machine 15. Each of the pins 91 is provided with a longitudinally extending flange 92, as best seen in Figure 8, the lower end of which is spaced from the lower end of the pin 91 and rests upon one of the plates 49 to support the pin in an opening thereof. The lower ends of the flanges 92 are flat and relatively long to abut the plates 49 for bracing the pins 91 to resist the thrust exerted thereagainst by the jaw 82 when the jaw 83 is displaced in a direction toward the jaw 82, by advancement of the follower 70 toward the front end of the machine 15.

Any suitable element or work piece is adapted to be gripped between the jaw faces 84 and thus held securely against displacement or distortion while a welding operation is being performed thereon and it will be additionally apparent that the jaw faces 84 in addition to preventing distortion of the work piece during the welding operation will also tend to straighten the work piece. Figures 3 and 4 illustrate a rod or shaft 93 forming a work piece which is shown clamped between the jaw faces 84 and if desired and as illustrated in these views, a shim 94 may be inserted between each of the jaw faces 84 and the work piece 93.

Internally threaded vertically disposed sockets 95 are secured in the end portions of the jaws 82 and 83 to receive the threaded shanks of eye bolts 96, the eyes of which are disposed above said jaws. The rods 97 extend through the adjacently disposed aligned eyes 96 of the two jaws 82 and 83 and it will be readily apparent that the eyes of said eye bolts may be positioned at different elevations for varying the elevation of the rods 97. The rods 97 primarily function as hold down means where the work piece 93 includes a blade or flange 98, as illustrated in Figure 3, wherein the rods 97 are shown engaging the upper edge of the flange or blade 98. A hold down unit is employed for each end of each jaw, said unit including an elongated threaded rod 99 having a hook shaped lower end 100 which engages under the bottom edge of one of the flanges 31, as best seen in Figure 7. The threaded rods 99 each extend upwardly from their hook end 100 through an end portion of one of the jaws and through a rigid bar 101 which rests upon the upper edges of certain of the walls of said jaw. A nut 102 having a turning handle 103 is threadedly connected to the upper end of each rod 99 and is tightened downwardly to bear against the upper surface of the bar 101 through which the said rod extends. Accordingly, after the jaws have been brought into clamping engagement with the work piece 93 and the eye screws 96 and rods 97 have been applied in adjusted positions to engage the upper edge of the flange or web 98, the rods 99, bars 101 and nuts 102 are applied and the nuts are tightened for drawing the jaws 82 and 83 downwardly tight against the upper surfaces of the plates 49 and 68 so that the rods 97 will exert a downward thrust against the blade or web 98 for holding the work piece 93 tight against the plates 49 and 68 to thus prevent vertical distortion of the work piece and to straighten said work piece, if necessary. Obviously, the work 93, 98 may be of various sizes and shapes and the jaws may be employed without the shims 94 where advisable and it will be obvious that the parts previously described will cooperate to straighten the work piece in all directions and to hold the work piece against distortion in any direction during the welding operation. The jaws 82 and 83 and associated parts may also be employed to initially form or shape a work piece before welding and to hold it properly formed and shaped during welding.

It is to be understood that Figures 1 to 7 merely illustrate one type of jaw for use with the machine 15 and that pairs of jaws of various other shapes are intended to be employed with the remainder of the machine 15 since the jaws 82 and 83 may be lifted off of the machine after the follower 70 has been backed off from its position of Figure 1 and after the nuts 102 have been removed. Figures 9 and 10 illustrate a differently shaped pair of jaws designated 104 and 105 wherein said jaws have concentric arcuately curved adjacent walls defining jaw faces 106 and 107 respectively. The stationary jaw 104 is provided with a plurality of openings 108 to receive the pins 91 for detachably supporting said jaw in a stationary position on the plates 49, in the same manner as illustrated in Figure 1. The movable jaw 105 is provided with a relatively large opening 109 for receiving the upper portion of the follower 70 by means of which the said jaw 105 may be displaced toward or away from the jaw 104 for clamping or forming an arcuate work piece, not shown, between the jaw faces 106 and 107 and which will shape the work piece to the shape of said jaw faces. The jaws 104 and 105 are also provided with threaded sockets 95a, corresponding to the sockets 95 for use with the eye bolts 96 and rods 97.

Figure 11 illustrates a third type of jaws including a stationary jaw 104a and a movable jaw 105a which jaws are provided with jaw faces 106a and 107a respectively, which define a substantially V-shaped space therebetween and wherein complementery end portions of the two jaw faces are disposed at right angles to one another. It will likewise be readily apparent that the angular jaw faces 106 and 107 may have their end portions disposed at other angles than the 90° angle as illustrated. The jaw 104a is provided with a plurality of openings 108a for receiving the pins 91 for detachably supporting said jaw in a stationary position or on the plates 49 against movement away from the jaw 105a. The said jaw 105a is provided with an opening 109a for the same purpose as the opening 109 and each of the jaws 104a and 105a is provided with threaded sockets 95b for the same purpose as the sockets 95 and 95a.

Various modifications and changes are contemplated and may obviously be resorted to, without departing from the spirit or scope of the invention as hereinafter defined by the appended claims.

I claim as my invention:

1. A metal forming and welding machine comprising a stand including a top portion and depending supporting legs secured to and depending from said top portion, a pair of supporting plates forming a part of said top portion and defining a work supporting section, said plates being spaced from one another to define a cavity in said top portion between adjacent edges of said plates, a movable jaw actuating unit detachably supported in the top portion of the stand and occupying the cavity between said supporting plates including a bottom plate and a top plate, an end plate connecting corresponding ends of the top plate and bottom plate, said top plate being disposed above and spaced from the bottom plate, a bushing mounted in said end plate between said top and bottom plates at one end of the movable jaw actuating unit, a feed screw having a portion journalled in said bushing and extending therefrom to adjacent the opposite end of the movable jaw actuating unit and disposed between the top and bottom plates with the axis of the feed screw disposed below, intermediate and parallel to the inner edges of the supporting plates, a follower threadedly engaging said feed screw and movable longitudinally of said movable jaw actuating unit by rotation of the feed screw, said follower having a bottom portion disposed between the top and bottom plates and a top portion disposed above said top plate for reciprocating movement of said top portion of the follower above the top portion of the stand, means for imparting rotation to the feed screw in either direction for moving the follower toward and away from either end of the movable jaw actuating unit, a stationary clamping jaw detachably mounted on said supporting plates transverse to the direction of movement of the follower, means for detachably and adjustably retaining said stationary jaw on the supporting plates against movement away from the follower, and a movable clamping jaw demountably and slidably supported on said supporting plates and having an opening therein in which the upper portion of the follower is received and having portions engageable by opposite sides of the upper portion of the follower for displacing the movable jaw toward or away from the stationary jaw when the follower is actuated by rotation of the feed screw.

2. A forming and welding machine as in claim 1, the upper surface of said top plate being disposed in the same plane as the upper surfaces of the supporting plates to combine therewith for supporting the fixed and movable jaws.

3. A forming and welding machine as in claim 2, said supporting plates having a plurality of longitudinally and transversely spaced openings, and a plurality of flanged pins selectively engaging said openings and supported by the plates in upstanding relationship thereto and engaging portions of the fixed clamping jaw for detachably retaining said fixed clamping jaw in selected positions on the top portion of the stand and against movement in a direction away from the movable clamping jaw.

4. A forming and welding machine as in claim 1, said jaws having adjacent jaw faces between which a work piece is adapted to be clamped for shaping and holding the work piece during a welding operation performed thereon, means detachably connected to the jaws and extending across the jaw faces above the jaws and adapted to engage a portion of the work piece to maintain the work piece against the supporting plates and top plate, and hold down means detachably anchored to a bottom edge of the top portion of the stand and engaging end portions of said jaws for displacing the jaws downwardly against the supporting plates.

5. A forming and welding machine as in claim 1, the said bottom plate having spaced ways extending longitudinally of the movable jaw actuating unit, and the bottom portion of said follower having a bottom surface provided with grooves for slidably engaging said ways.

6. A forming and welding machine as in claim 1, the said follower having a slot interposed between its top and bottom portions for accommodating said top plate.

7. A metal forming and welding machine as in claim 1, said bushing having an outer end projecting outwardly from an end of said movable jaw actuating unit, a socket member secured to one end of said feed screw and disposed beyond the outer end of said bushing, and a hand crank having a shank end detachably secured in said socket perpendicular to the axis of the feed screw for manually rotating the feed screw in either direction and forming the means for imparting rotation to the feed screw.

8. A forming and welding machine as in claim 1, said top portion of the stand including a substantially rectangular bottom frame section, a pair of girders secured to said bottom frame section adjacent opposite parallel sides thereof, a pair of truss members supported by said girders beneath the cavity formed by said supporting plates having upper surfaces forming supports for the bottom plate of the movable jaw actuating unit.

9. A forming and welding machine as in claim 8, said bottom plate having transversely extending depending flanges adjacent the ends thereof and disposed against opposite sides of said bottom frame section, and fastenings securing said flanges to the said bottom frame section for detachably securing the movable jaw actuating unit to the top portion of the stand.

10. A forming and welding machine as in claim 8, corresponding bars disposed on edge and secured to end portions of the bottom frame section for supporting plates above said bottom frame section and combining with said supporting plates to define the cavity for accommodating the movable jaw actuating unit therebetween.

11. A forming and welding machine as in claim 1, said jaws having substantially straight parallel jaw faces disposed perpendicular to the plane of the supporting plates in opposed relationship to one another between which a work piece is adapted to be clamped and shaped when the movable jaw is displaced toward the stationary jaw.

12. A forming and welding machine as in claim 1, said jaws having concentrically disposed arcuate jaw faces disposed in opposed relationship to one another the planes of which are disposed perpendicular to the plane of the supporting plates.

13. A forming and welding machine as in claim 1, each of said jaws being of openwork construction and including angularly disposed walls defining coacting jaw faces, said jaw faces being disposed in opposed relationship to one another and perpendicular to the plane of the supporting plates, the jaw faces of the two jaws defining a work piece receiving space therebetweeen and having angularly disposed end portions.

WILLIAM E. PRICE.

References Cited in the file of this patent

UNITED STATES PATENTS

| Number | Name | Date |
|---|---|---|
| 1,557,514 | Wise | Oct. 13, 1925 |
| 1,648,409 | Kuney | Nov. 8, 1927 |
| 1,753,263 | Cromwell | Apr. 8, 1930 |
| 1,865,916 | Jolley | July 5, 1932 |
| 2,219,742 | Haversack | Oct. 29, 1940 |
| 2,212,421 | Henderson | Aug. 20, 1940 |
| 2,322,380 | Mosley | June 22, 1943 |
| 2,389,526 | Maulding | Nov. 20, 1945 |